United States Patent

Bte,uml/u/ hler et al.

Patent Number: 4,802,889
Date of Patent: Feb. 7, 1989

[54] 2-CYANO-4,6-DINITROPHENYL MONO-AZO DYES FOR POLYESTER AND CELLULOSE ACETATE

[75] Inventors: Ulrich Bte,uml/u/ hler, Alzenau; Horst Tappe, Dietzenbach; Reinhard Kühn, Frankfurt; Albert Bode, Schwalbach; Margareta Boss, Hattersheim, all of Fed. Rep. of Germany

[73] Assignee: Cassella Aktiengesellschaft, Frankfurt am Main, Fed. Rep. of Germany

[21] Appl. No.: 88,831

[22] Filed: Aug. 24, 1987

Related U.S. Application Data

[63] Continuation of Ser. No. 896,811, Aug. 15, 1986, abandoned.

[30] Foreign Application Priority Data

Sep. 24, 1985 [DE] Fed. Rep. of Germany ....... 3533980

[51] Int. Cl.[4] ...................... C09B 29/08; C09B 43/42; D06P 1/18; D06P 3/36
[52] U.S. Cl. ........................................... 8/639; 8/662; 8/921; 8/922; 534/597; 534/843; 534/854; 534/855
[58] Field of Search .................... 8/639, 662; 534/597, 534/843, 854, 855

[56] References Cited

U.S. PATENT DOCUMENTS

| | | | |
|---|---|---|---|
| 3,962,209 | 6/1976 | Gotteschlich et al. | 534/597 |
| 4,237,048 | 12/1980 | Gotteschlich et al. | 534/850 |
| 4,289,694 | 9/1981 | Belfort | 534/597 |
| 4,315,857 | 2/1982 | Buecheler | 534/597 |
| 4,405,330 | 9/1983 | Bergmann et al. | 8/639 |
| 4,430,090 | 2/1984 | Buhler et al. | 8/508 |

FOREIGN PATENT DOCUMENTS

| | | |
|---|---|---|
| 2950588 | 6/1981 | Fed. Rep. of Germany . |
| 343560 | 2/1960 | Switzerland . |
| 640560 | 1/1984 | Switzerland . |
| 1184825 | 3/1970 | United Kingdom . |
| 1578732 | 4/1980 | United Kingdom . |
| 2108141 | 3/1983 | United Kingdom . |

Primary Examiner—A. Lionel Clingman
Attorney, Agent, or Firm—Connolly and Hutz

[57] ABSTRACT

Monoazo dyestuff of the formula

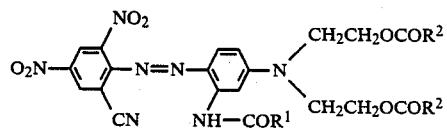

wherein
  $R^1$ is 4 alkyl having 1 to 3 carbon atoms, and
  $R^2$ is methyl, ethyl or alkoxy having 1 to 4 carbon atoms hich is unsubstituted or substituted by methoxy or ethoxy is useful for dyeing and printing hydrophobic fibers a blue color.

13 Claims, No Drawings

2-CYANO-4,6-DINITROPHENYL MONO-AZO DYES FOR POLYESTER AND CELLULOSE ACETATE

This is a continuation of application Ser. No. 896,811 filed Aug. 15, 1986, abandoned.

The present invention relates to valuable monoazo dyestuffs of the general formula I

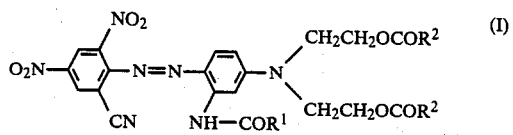

in which
R[1] denotes alkyl having 1 to 3C atoms and
R[2] denotes methyl, ethyl or alkoxy which has 1 to 4C atoms and can be substituted by methoxy or ethoxy.

The invention also relates to mixtures of dyestuffs of the general formula I and to the preparation of these dyestuffs and mixtures thereof and their use for dyeing hydrophobic fibre materials.

The alkyl radical having 1 to 3C atoms which is represented by R[1] can denote methyl, ethyl, n-propyl or isopropyl.

Alkoxy groups having 3 or 4C atoms in the radical R[2] can be linear or branched. Alkoxy radicals which can be represented by R[2] are as follows: methoxy, ethoxy, n-propoxy, isopropoxy, n-butoxy, isobutoxy, sec.-butoxy and tert.-butoxy. Examples of alkoxy radicals substituted by methoxy or ethoxy which can be represented by R[2] are 2-methoxyethoxy and 2-ethoxyethoxy.

Methyl and ethyl are preferred radicals for R[1].

Preferred radicals for R[2] are methyl, ethyl, methoxy, ethoxy, isopropoxy, methoxyethoxy and ethoxyethoxy; of these, methyl, ethyl, methoxy and ethoxy are particularly preferred.

Dyestuffs according to the invention in which R[1] denote methyl or ethyl and R[2] denotes methyl are particularly preferred.

Dyestuffs according to the invention having several preferred characteristics, such as, for example, dyestuffs in which R[1] and R[2] independently of one another denote methyl or ethyl, or dyestuffs in which R[1] denotes methyl or ethyl and R[2] denotes methoxy or ethoxy, are also particularly preferred.

Dyestuffs similar to the dyestuffs according to the invention are already known and are described in German Offenlegungsschriften Nos. 1,544,563 (corresponding to U.S. Pat. Nos. 3,962,209; 4,105,655 and 4,237,048), 2,724,117 (corresponding to British Pat. No. 1,578,732), 2,922,226 (corresponding in U.S. Pat. Nos. 4,289,694) and 3,025,957 (corresponding to U.S. Pat. No. 4,315,857) and also in U.S. Pat. No. 4,237,048. However, it has been found, surprisingly, that the dyestuffs according to the invention are markedly superior to these known dyestuffs in their tinctorial behaviour on various substrates and also in regard to certain important fastness properties in application and use, such as fastness to thermal migration, fastness to thermofixing, fastness to washing and fastness to light. The total result of this is a considerable advantage, which could not have been foreseen, in technical performance for the dyestuffs according to the invention and mixtures thereof.

The preparation of the dyestuffs according to the invention is preferably effected by subjecting an azo-dyestuff of the formula II

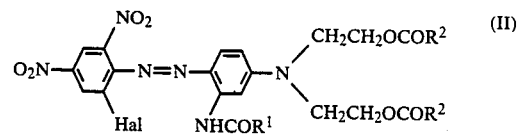

in which Hal denotes a halogen atom, such as chlorine or especially bromine, to a nucleophilic replacement reaction in a manner which is in itself known, for example in accordance with the instructions of German Offenlegungsschriften Nos. 1,809,920 or 1,809,921 (corr. to U.S. Pat. No. 3,845,034), British Patent specification No. 1,184,825, German Auslegeschrift No. 1,544,563, German Offenlegungsschrift No. 2,310,745 (corresponding to U.S. Pat. No. 3,978,040), German Auslegeschriften Nos. 2,456,495 (corresponding to U.S. Pat. Nos. 4,045,430) and 2,610,675 (corresponding to U.S. Pat. No. 4,348,319), German Offenlegungsschriften Nos. 2,724,116 (corresponding to British Pat. No. 1,578,731), 2,724,117, 2,834,137 (corresponding to U.S. Pat. No. 4,192,800) or 2,341,109 (corr. to British Pat. No. 1,438,374) U.S. Pat. No. 3,821,195 or German Offenlegungsschriften Nos. 2,715,034 (corresponding to U.S. Pat. Nos. 4,126,610 and 4,165,297) or 2,134,896 (corr. to U.S. Pat. No. 3,876,621), the cyanide ion $CN^{\ominus}$ being employed as the nucleophilic agent. In this reaction, Hal is replaced by CN in the dyestuff of formula II.

The solvents employed for the replacement reaction are inert organic solvents, such as, for example, nitrobenzene or glycolmonomethyl or monoethyl ethers or diglycolmonomethyl or monoethyl ethers or mixtures of such solvents with one another and with tertiary organic nitrogen bases, or dipolar, aprotic solvents, such as, for example, N-methylpyrrolidone, pyridine, dimethylformamide, dimethyl sulphoxide or dicyanodialkyl thioethers. Further suitable media for the replacement reaction are water or aqueous systems consisting of water and a water-immiscible organic solvent, such as, for example, nitrobenzene, preferably in the presence of a wetting or dispersing agent or of a known phase transfer catalyst, or consisting of water and a water-soluble, inert organic solvent, such as ethylene glycol or dimethylformamide.

The presence of organic, basic nitrogen compounds, such as, for example, pyridine and pyridine bases, also has a favourable effect on the replacement reaction.

The reaction temperatures for the replacement reaction are normally between 20° and 150° C.

The nucleophilic agent $CN^{\ominus}$ is added to the reaction in the form of a metal cyanide, if appropriate a complex metal cyanide, such as, for example, an alkali or alkaline earth metal cyanide, zinc cyanide or an alkali metal cyanozincate or cyanoferrate, but preferably in the form of copper-I cyanide or a system which forms copper-I cyanide. The use of a combination of an alkali metal cyanide with copper-I cyanide has proved particularly suitable, it being possible to vary the ratio by weight of the alkali metal salt to the copper salt within wide limits.

The customary range for the alkali metal cyanide: copper-I cyanide weight ratio is 5:95 to 95:5. The favourable mutual effect of the components can also be detected even outside these limits. It is, of course, also possible to replace the copper-I cyanide for its part by a system which forms copper-I cyanide, such as, for example, a combination of an alkali metal cyanide with another copper salt, preferably a copper-I salt, such as, for example, a copper-I halide.

The dyestuffs of the formula II required for the preparation of the dyestuffs according to the invention can be prepared by coupling a diazonium compound of an aromatic amine of the general formula III

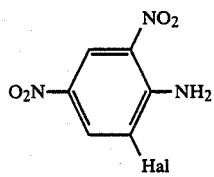

in a manner which is in itself known with a coupling component of the general formula IV

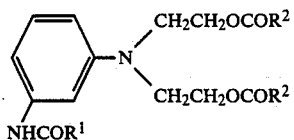

wherein Hal, $R^1$ and $R^2$ have the meanings indicated above.

The diazonium compounds are obtained from the amines of the general formula III in a manner which is in itself known by the action of nitrous acid or other systems which form nitrosonium ions, in a mineral acid or an aqueous medium containing mineral acid, or a lower alkane carboxylic acid, such as, for example, formic acid, acetic acid or propionic acid or mixtures thereof, at temperatures from $-15°$ C. to $40°$ C.

The coupling is also effected in a manner which is in itself known by combining the resulting diazo solution with a solution of the coupling component at temperatures from $0°$ to $40°$ C., preferably $0°$ to $25°$ C., in a suitable solvent, such as, for example, an alkanol having 1 to 4C atoms, dimethylformamide or, preferably, water acidified with sulphuric acid, hydrochloric acid or phosphoric acid, or in a lower alkane carboxylic acid or a mixture of lower alkane carboxylic acids, optionally containing water.

In some cases it can be expedient to buffer the pH during the coupling, for example by adding sodium acetate. The coupling is complete after a few hours, and the dyestuff of formula II can be isolated and dried in a customary manner.

The required coupling components of the formula IV can be prepared by known processes from known commercial products.

A further process for the preparation of the dyestuffs according to the invention consists in acylating dyestuffs of the formula V

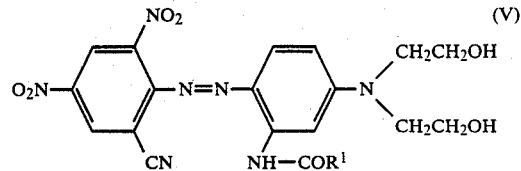

by means of known acylating agents of the formula $$X-CO-R^2$$

in which X is a radical which can be detached, together with the the bonding pair of electrons, and $R^2$ has the meaning mentioned above, and which effect the replacement of the protons of the hydroxyl groups by the group $-CO-R^2$. If $R^2$ is an alkyl group, examples of suitable acylating agents for the dyestuff of the formula V are reactive derivatives of carboxylic acids of the formula $$R^2-COOH,$$

such as, for example, carboxylic acid halides, in particular carboxylic acid chlorides or anhydrides. If $R^2$ is an alkoxy group, suitable acylating agents are reactive derivatives of formic acid esters of the formula $$HCO-OR^2,$$

such as, for example, halogenoformic acid esters, in particular chloroformic acid esters ($ClCO-OR^2$) or carbonic acid diesters ($OC(OR^2)_2$).

In carrying out the acylation reaction it is expedient to carry out the reaction in a solvent or diluent, in order to moderate it. Any organic solvents which cannot enter into reaction with the acylating agents are suitable. The solvents, diluents or dispersing agents used are mainly aromatic hydrocarbons, such as benzene, toluene or xylene, and it is also expedient to carry out the acylation in the presence of an acid acceptor, such as, for example, a tertiary organic amine base. Acylation reactions of the type mentioned can also be carried out in the presence of pyridine or pyridine derivatives as solvent. In this case, the solvent itself acts as an acid acceptor. Acylation by means of alkane carboxylic anhydrides is preferably carried out in an excess of the alkane carboxylic anhydride itself, or in the corresponding alkane carboxylic acid, as solvent. The acylation of the dyestuffs of the formula V can be effected at temperatures between normal room temperature and temperatures up to $150°$ C. As a rule, at least two moles of the acylating agent are employed per mole of dyestuff of the formula V.

The dyestuffs of the formula V which are required for this process of preparation can be prepared by coupling a diazonium compound of an aromatic amine of the general formula III

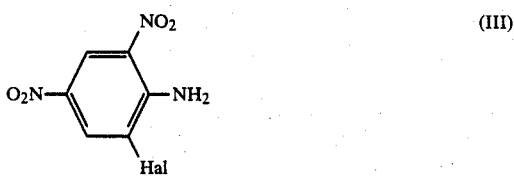

in a manner which is in itself known with a coupling component of the general formula VI

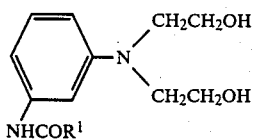

wherein Hal and $R^1$ have the meanings indicated above, and then replacing the halogen atom Hal by the cyano radical.

The diazotization of the aromatic amine of the formula III and the coupling of the resulting diazonium compound with the amine of the formula VI is effected within the scope of the conditions which have already been described above in detail for the preparation of the dyestuffs of the formula II. The subsequent replacement of the halogen atom Hal by cyano is also effected within the scope of the conditions indicated above for the preparation of the dyestuffs, according to the invention, of the formula I.

Dyestuff mixtures according to the invention consist of two or more dyestuffs of the formula I in which $R^1$ and $R^2$ have the meanings indicated above. Mixtures of dyestuffs of the formula I differing only in the meaning of the radical $R^1$ are preferred.

The ratio of the various dyestuffs of the general formula I in the dyestuff mixtures according to the invention can vary within relatively wide limits, and the dyestuffs can be present in the form of mixtures of crystals or entirely or partly in the form of mixed crystals. In general, the minimum proportion by weight of one component is 10% and its maximum proportion by weight is 90%. In the case of dyestuff mixtures consisting only of two dyestuffs of the general formula I, a ratio by weight of 70:30 to 30:70 is preferred, that is to say the proportion by weight of a dyestuff is 30 to 70%.

The dyestuff mixtures according to the invention can be prepared by various processes:

(1) By mixing at least two individual dyestuffs of the formula I which have been separately prepared and conditioned. As a rule, mixing is carried out in the presence of a liquid phase, preferably with the addition of dispersing agents. This mixing process is carried out at temperatures from 0° to 190° C., expediently in suitable mills, for example ball mills and sandmills, and also kneaders, but can also be effected by hand mixing or by stirring the dyestuffs into dispersing agents or dye liquors.

Liquid dispersing agents or organic solvents, preferably water-miscible solvents, which dissolve the dyestuffs only slightly or not at all are employed as the liquid phase. Water is preferably employed as the liquid phase.

Suitable dispersing agents are those of an anionic or non-ionic nature. Anionic dispersing agents which may be mentioned are condensation products of naphthaline, formaldehyde and sulphuric acid, and also lignin sulphonates. Suitable non-ionic dispersing agents are described, for example, in German Offenlegungsschrift No. 2,757,330.

Dyestuff mixtures in which the dyestuffs are entirely or mainly in the form of mixtures of crystals are obtained in this method of mixing, particularly if mixing is carried out at a low temperature. At a higher temperature and with a longer period of mixing, however, mixtures prepared in this manner can contain varying proportions of mixed crystals of the individual dyestuffs employed.

Conditioned individual dyestuffs are dyestuffs which, after chemical synthesis, have been subjected to conditioning, that is to say a physical treatment in the course of which the dyestuffs have the opportunity to assume, substantially, a specific, desired crystal modification. Various physical treatments of this type are known, for example treatment with water or organic solvents, preferably under the influence of shear forces, in particular treatment with water in the presence of dispersing agents. Depending on the crystal modification desired and the rate of modification, the treatment can be carried out at temperatures from 0° to approx. 190° C. As a rule, the object of conditioning is to obtain a crystal modification which is particularly stable at elevated temperatures. It is therefore expedient to carry out the conditioning at temperatures above 80° C., preferably 90°–150° C. and especially 100°–140° C.

Conditioned individual dyestuffs having a substantially uniform and stable crystal structure can, however, also be obtained if, in the course of its synthesis, the dyestuff has had the opportunity for conditioning, which is the case, in particular, if it has, in the course of this, been heated to a temperature of at least 80° C., preferably 90°–150° C., and especially 100°–140° C. Here too, additional agents, such as organic solvents and especially dispersing agents, can also be required.

(2) The preparation of the dyestuff mixtures can also be effected by mixing individual dyestuffs which have been separately prepared, but not conditioned, and by conditioning them together.

The mixing and common conditioning of the dyestuff mixture is effected in the same manner as that described above. Dyestuff preparations containing at least partly, but often predominantly or entirely, mixed crystals of the dyestuffs employed are generally obtained in this procedure.

(3) Further possible means of preparing the dyestuff mixtures according to the invention consist in employing suitable mixtures of the starting materials in the preparation by one of the processes of preparation described above for the individual dyestuffs according to the invention, and, if appropriate, additionally subjecting the dyestuff mixtures thus obtained to conditioning in the manner described above.

If, for example, a mixture of two or more dyestuffs of the formula II differing from one another in respect of $R^1$ and/or $R^2$ is employed in the cyano replacement process described above instead of an individual dyestuff of the formula II, the corresponding mixture of the dyestuffs, according to the invention, of the formula I is obtained.

The mixture of dyestuffs of the formula II employed in this case can, of course, in turn be obtained by mixing separately prepared dyestuffs of the formula II, or it can be prepared by coupling the diazonium compound of an amine of the formula III with a corresponding mixture of coupling components of the formula VI, differing from one another in respect of $R^1$ and/or $R^2$.

In the acylation process described above it is also possible to acylate a mixture of two or more dyestuffs of the formula V differing from one another in respect of $R^1$, instead of acylating an individual starting dyestuff of the formula V. A further variant of this process is the acylation of a dyestuff or a mixture of two or more dyestuffs of the formula V differing in respect of $R^1$, using a mixture of two or more acylating agents differing from one another in respect of $R^2$.

If, in the course of one of the mixed syntheses described, operations are carried out at an elevated temperature, in particular above 80° C. and preferably within the range from 90° to 150° it is possible to obtain a conditioned form of the dyestuff mixture as early as the synthesis stage. In cases where the synthesis is carried out at a low temperature, the resulting dyestuff mixture can, if desired, be subjected to a conditioning process, as described above.

When preparing the dyestuff mixtures by the above mixing syntheses, the mixing of the starting materials is selected, in a known manner, in such a way that the desired dyestuff mixture according to the invention is obtained. Thus it stands to reason that a mixture of coupling components of the formula IV consisting of a% of the component having the characteristic A and b% of the component having the characteristic B (for example 80% of the component in which $R^1=CH_3$ and 20% of the component in which $R^1=C_2H_5$) will be employed for the preparation of a dyestuff mixture according to the invention in which a% of a dyestuff having the characteristic A and b% of a dyestuff having the characteristic B are present (for example a mixture of 80% of a dyestuff in which $R^1$—$CH_3$ and 20% of a dyestuff in which $R^1=C_2H_5$).

Dyestuff mixtures which are particularly preferred are those which have been heated in the course of their preparation to temperatures of at least 80° C., preferably 90° to 150° C. and particularly preferably 100° to 140° C., or dyestuff mixtures consisting of, or containing, mixed crystals which have been formed from two or more of the dyestuffs of the formula I.

Dyestuff mixtures which have been heated to the said temperatures of at least 80° C. in the course of their preparation can be prepared by heating the individual dyestuffs, undiluted or, preferably, in a dispersing agent, such as, for example, water, at the said temperatures for 0.5 to 3 hours, then cooling them, as a rule isolating them and then mixing them with one another. If appropriate, the heating can also be carried out in the course of recrystallizing the individual dyestuffs. Heating in water at temperatures above 100° C. is carried out in a closed vessel. In the case of heating in a dispersing agent, the addition of one or more of the dispersing agents indicated later in the text can be expedient.

If a dyestuff mixture consisting of two or more individual dyestuffs is heated at the temperatures mentioned above, mixed crystals consisting of two or more different dyestuffs of the formula I are, as a rule, obtained.

Dyestuff mixtures according to the invention, consisting of mixed crystals or containing mixed crystals, can also be obtained by dissolving a mixture of at least two separately prepared, different dyestuffs of the formula I and causing this to crystallize or precipitate. Examples of materials suitable for dissolving the dyestuff mixture are organic solvents, such as dimethylformamide, dimethyl sulphoxide, chlorobenzene, o-dichlorobenzene, toluene etc. It is also possible to use mixtures of different solvents. The dissolution is expediently carried out at the boiling point of the solvent or solvent mixture. On cooling, mixed crystals then crystallize out. Instead of cooling, the mixed crystals can also be induced to separate out by precipitation, that is to say by adding a solvent in which the dyestuff is less soluble.

Mixed crystals are obtained particularly preferably if the abovementioned replacement of halogen by cyano is carried out with a mixture consisting of dyestuffs of the formula II at the temperatures of at least 80° C. mentioned above.

The formation of mixed crystals can also preferably be carried out by incipiently warming a mixture of at least two separately prepared, different dyestuffs of the formula I in a solvent or dispersing agent of poor solvent power, whereupon only partial down to vanishingly small dissolution takes place, and the mixture is thereby converted into mixed crystals. Water at temperatures from 80° to 190° C., in particular 90° to 150° C. and preferably 100° to 140° C., has proved to be a particularly suitable solvent, or rather dispersing agent, for such a conversion of the dyestuff mixtures into mixed crystals. It stands to reason that heating at temperatures which can no longer be reached in an open vessel will be carried out in an autoclave. The addition of one or more solubilizers is expedient in this process. A solubilizer of this type is, for example, a solvent which is soluble in all proportions in water, such as, for example, ethanol, or an organic solvent which is only partly soluble in water, such as, for example, n-butanol.

However, it is particularly preferable to carry out the conversion of the dyestuff mixtures into mixed crystals by heating in water at the temperatures mentioned above, with the addition of one or more emulsifiers and/or dispersing agents.

Examples of suitable dispersing agents are anionic or non-ionic dispersing agents, and these can also be employed jointly. Examples of anionic dispersing agents are condensation products formed from aromatic sulphonic acids and formaldehydes, in particular condensation products formed from alkylnaphthaline sulphonic acids and formaldehyde, condensation products formed from optionally substituted phenol with formaldehyde and sodium bisulphite, alkali metal salts of condensation products formed from optionally substituted phenol, naphthaline sulphonic or naphthol sulphonic acids, formaldehyde and sodium bisulphite, alkali metal salts of condensation products formed from optionally substituted phenol sulphonic acids, formaldehyde and urea, and also alkali metal salts of lignin sulphonic acids, alkylsulphonates or alkyarylsulphonates and also alkylaryl polyglycol ether-sulphates. Examples of nonionic dispersing agents or emulsifiers are reaction products of alkylene oxides, such as, for example, ethylene oxide or propylene oxide, with alkylateable compounds, such as, for example, fatty alcohols, fatty amines, fatty acids, phenols, alkylphenols, arylalkylphenols, arylalkylarylphenols and carboxamides, such as, for example, products from the addition reaction of 5 to 10 ethylene oxide units with $C_8$–$C_{10}$-alkylphenols.

As a rule, the conversion of the dyestuff mixtures into mixed crystals by heating in water is complete after 0.5 to 10 hours, preferably 1 to 3 hours. The presence of mixed crystals can be demonstrated by X-ray tube counter diagrams.

The dyestuffs and dyestuff mixtures according to the invention are excellently suitable, on their own or mixed with other dispersed dyestuffs, for dyeing and printing hydrophobic synthetic materials. The following are examples of suitable hydrophobic synthetic materials: cellulose 2½-acetate, cellulose triacetate, polyamides and high-molecular polyesters. It is preferable to employ the dyestuffs according to the invention for dyeing and printing materials composed of high-molecular polyesters, in particular those based on polyethylene glycol terephthalates or mixtures thereof with natural fibrous materials, or materials composed of cellulose triacetate.

The hydrophobic synthetic materials can be in the form of sheet-like or filamentous structures and can have been processed to give, for example, yarns or woven, warp-knitted or weft-knitted textile materials. The fibre material mentioned is dyed with the dyestuffs or dyestuff mixtures according to the invention in a manner which is in itself known, preferably from an aqueous suspension, if appropriate in the presence of carriers, by the exhaustion process between 80° and approx. 110° C. or by the HT process in a dyeing autoclave at 110° to 140° C. and by the so-called thermofixing process, wherein the goods are padded with the dye liquor and are then fixed at about 80° to 230° C. The materials mentioned can be printed in a manner which is in itself known by incorporating the dyestuffs or dyestuff mixtures according to the invention into a printing paste and treating the goods printed therewith, if appropriate in the presence of a carrier, at temperatures between 80° and 230° C. with HT steam, steam under pressure or dry heat, in order to fix the dyestuff. Very deep reddish-tinged blue dyeings and prints having very good fastness properties, in particular very good fastness to light, thermofixing, thermal migration and washing, above all very good M+S fastness (C4A washing) are obtained in this way.

The dyestuffs or dyestuff mixtures according to the invention are also suitable for dyeing the hydrophobic materials listed above from organic solvents by the methods known for this purpose, and for mass dyeing.

The dyestuffs or dyestuff mixtures according to the invention should be present in as fine a state of distribution as possible in the dye liquors and printing pastes employed in the above applications.

The dyestuffs are brought into a state of fine division in a manner which is in itself known by suspending the dyestuff obtained in the production, together with dispersing agents, in a liquid medium, preferably in water, and exposing the mixture to the action of shear forces, whereby the dyestuff particles originally present are comminuted mechanically to such an extent that an optimum specific surface is achieved, and the sedimentation of the dyestuff is as low as possible. In general, the particle size of the dyestuffs is between 0.5 and 5 μm, preferably about 1 μm.

The dispersing agents used concomitantly in the grinding process can be nonionic or anionic. Examples of nonionic dispersing agents are reaction products of alkylene oxides, such as, for example, ethylene oxide or propylene oxide, with alkylatable compounds, such as, for example, fatty alcohols, fatty amines, fatty acids, phenols, alkylphenols and carboxamides. Examples of anionic dispersing agents are ligninsulphonate, alkylsulphonates or alkylarylsulphonates or alkylaryl polyglycol ether-sulphates.

The dyestuff preparations thus obtained should be pourable for most modes of application. The content of dyestuff and dispersing agent is therefore limited in these cases. In general, the dispersions are standardized to a dyestuff content of up to 50% by weight and a dispersing agent content of up to about 25%. For economic reasons, the dyestuff content does not in most cases fall below 15% by weight.

The dispersions can additionally contain further auxiliaries, for example those which act as oxidizing agents, such as, for example, sodium m-nitrobenzenesulphonate, or fungicidal agents, such as, for example, sodium o-phenylphenate and sodium pentachlorophenate, and, in particular, so-called "acid donors", such as, for example, butyrolactone, monochloroacetamide, sodium chloroacetate, sodium dichloroacetate, the Na salt of 3-chloropropionic acid, half-esters of sulphuric acid, such as, for example, lauryl sulphate, and sulphuric acid esters of oxethylated and oxypropylated alcohols, such as, for example, butylglycol sulphate.

The dyestuff dispersions thus obtained can be used very advantageously for making up printing pastes and dye liquors. They offer particular advantages, for example, in the continuous processes, in which it is necessary to keep the dyestuff concentration of the dye liquors constant by continuously feeding in dyestuff into the apparatus while the latter is running.

Powder formulations are preferred for certain fields of application. These powders contain the dyestuff or the dyestuff mixture, the dispersing agent and other auxiliaries, such as, for example, wetting agents, oxidizing agents, preservatives and anti-dust agents and the "acid donors" mentioned above.

A preferred process for the preparation of pulverulent dye-stuff preparations consists in removing the liquid from the liquid dyestuff dispersions described above, for example by vacuum drying, freeze-drying or drying on drum dryers, but preferably by spray drying.

Dye liquors are prepared by diluting the requisite amounts of the standardized dyestuffs, prepared in accordance with the above instructions, with the dyeing medium, preferably water, until the dyeing has a liquor ratio of 1:5 to 1:50. In general, further dyeing auxiliaries, such as dispersing, wetting and fixing auxiliaries, are also added to the liquors. The pH is adjusted to a value of 4 to 5, preferably 4 in the case of dyestuffs of the general formula I in which $R^2$ represents alkyl having 1 to 2C atoms, by adding organic or inorganic acids, such as acetic acid, succinic acid, boric acid or phosphoric acid.

If the dyestuff or dyestuff mixture is to be used for textile printing, the requisite amounts of the standardized dyestuffs are kneaded together with thickeners, such as, for example, alkali metal alginates or the like, and, if appropriate, further additives, such as, for example, fixing accelerators, wetting agents and oxidizing agents, to give printing pastes.

The invention is illustrated in greater detail by means of the following examples. Percentage data are percent by weight.

EXAMPLE 1

(a) 60.9 g of the dyestuff of the formula VII

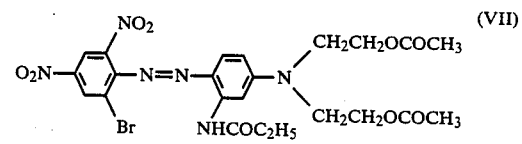

are introduced at 70° to 75° C. into a suspension consisting of 100 ml of dimethyl sulphoxide, 2.1 g of sodium cyanide and 7.1 g of copper-I cyanide, and the mixture is stirred at this temperature for 30 minutes. The temperature is then raised to 110° C. for 30 minutes and the mixture is then allowed to cool slowly, with stirring, and the product is filtered off with suction, washed with 45 ml of dimethylsulphoxide, 7.5% aqueous ammonia solution and water and dried under reduced pressure. This gives 42.3 g of a blue dyestuff of the formula VIII

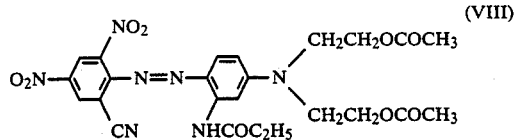

which has an absorption maximum at 592 nm.

A dyestuff preparation ready for dyeing is obtained by carrying out a conventional finishing process by aqueous grinding in a bead mill using a conventional dispersing agent with a liginsulphonate basis, followed by spray drying.

(b) 1.2 g of the dyestuff preparation thus obtained are dispersed in 2,000 g of water. 3.6 ml of 85% strength phosphoric acid are added to the dispersion, the pH is adjusted to a value of 4 with sodium hydroxide solution, and 2 g of a commercially available dispersing agent based on a naphthalinesulphonic acid/formaldehyde condensation product are added. 100 g of a polyester fabric based on polyethylene glycol terephthalate are introduced into the dye liquor thus obtained, and dyeing is carried out for 30 minutes at 130° C. Subsequent rinsing, reductive after-treatment with a 0.2% strength aqueous solution of sodium dithionite at 70° to 80° C. for 15 minutes, rinsing and drying give a deep blue dyeing having very good colouristic properties, in particular very good fastness to thermofixing, thermal migration and washing.

EXAMPLE 2

If 65.7 g of the dyestuff of the formula IX

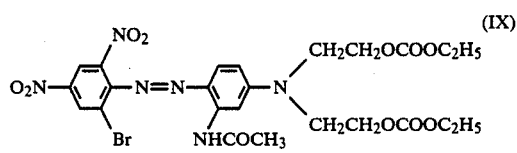

are subjected to cyanide replacement as described in Example 1, the temperature being raised, not to 110° C., but to 120° C. in the course of 30 minutes, and the dyestuff being filtered off with suction at 40° C. and washed with 100 ml of dimethyl sulphoxide at 40° C., 45.0 g of a reddish-tinged blue dyestuff of the formula X

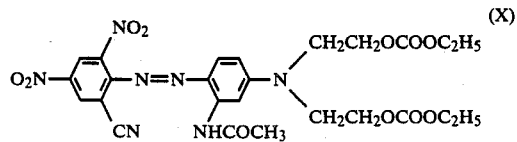

having an absorption maximum at 588 nm are obtained.

The dyestuffs, according to the invention, in the following table can be prepared analogously to Examples 1 and 2. They also dye hydrophobic fibres in full reddish-tinged blue shades of excellent fastness properties.

TABLE (I)

$O_2N$—⬡($NO_2$)($CN$)—N=N—⬡($NH$—$COR^1$)—N($CH_2CH_2OCOR^2$)($CH_2CH_2OCOR^2$)

| $R^1$ | $R^2$ | Shade on PES |
|---|---|---|
| $CH_3$ | $CH_3$ | reddish-tinged blue |
| $CH_3$ | $C_2H_5$ | reddish-tinged blue |
| $C_2H_5$ | $C_2H_5$ | reddish-tinged blue |
| $i$-$C_3H_7$ | $CH_3$ | reddish-tinged blue |
| $i$-$C_3H_7$ | $C_2H_5$ | reddish-tinged blue |
| $n$-$C_3H_7$ | $CH_3$ | reddish-tinged blue |
| $n$-$C_3H_7$ | $C_2H_5$ | reddish-tinged blue |
| $CH_3$ | $OCH_3$ | reddish-tinged blue |
| $CH_3$ | $n$-$OC_3H_7$ | reddish-tinged blue |
| $CH_3$ | $i$-$OC_3H_7$ | reddish-tinged blue |
| $CH_3$ | $n$-$OC_4H_9$ | reddish-tinged blue |
| $CH_3$ | $i$-$OC_4H_9$ | reddish-tinged blue |
| $CH_3$ | $O(CH_2)_2OCH_3$ | reddish-tinged blue |
| $CH_3$ | $O(CH_2)_2H_5$ | reddish-tinged blue |
| $C_2H_5$ | $OCH_3$ | reddish-tinged blue |
| $C_2H_5$ | $OC_2H_5$ | reddish-tinged blue |
| $C_2H_5$ | $i$-$OC_3H_7$ | reddish-tinged blue |
| $C_2H_5$ | $n$-$OC_4H_9$ | reddish-tinged blue |
| $C_2H_5$ | $O(CH_2)_2OCH_3$ | reddish-tinged blue |
| $i$-$C_3H_7$ | $OCH_3$ | reddish-tinged blue |
| $i$-$C_3H_7$ | $OC_2H_5$ | reddish-tinged blue |
| $i$-$C_3H_7$ | $n$-$OC_4H_9$ | reddish-tinged blue |
| $n$-$C_3H_7$ | $OCH_3$ | reddish-tinged blue |
| $n$-$C_3H_7$ | $OC_2H_5$ | reddish-tinged blue |
| $n$-$C_3H_7$ | $O(CH_2)_2OC_2H_5$ | reddish-tinged blue |

What is claimed is:

1. Monoazodyestuff of the formula

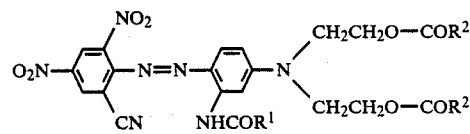

wherein $R^1$ is alkyl having 1 to 3 carbon atoms and $R^2$ is alkoxy having 1 to 4 carbon atoms which is unsubstituted or substituted by methoxy or ethoxy.

2. Azo dyestuff according to claim 1, wherein $R^1$ is methyl or ethyl and $R^2$ is methoxy or ethoxy.

3. Azo dyestuff according to claim 1 wherein $R^1$ is methyl and each of $R^2$ is ethoxy.

4. A mixture of at least two different azo dyestuff species of the formula according to claim 1.

5. A mixture of at least two different azo dyestuff species of the formula according to claim 1.

6. Process for the preparation of azo dyestuff according to claim 1 wherein a compound of the formula

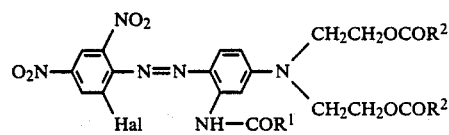

is subjected to a nucleophilic replacement reaction in which $CN^\ominus$ is the nucleophilic agent and replaces Hal, wherein Hal is halogen.

7. Process according to claim 6 wherein a mixture of at least two dyestuffs is prepared by subjecting at least two different species of said compound to nucleophilic replacement with CN⊖.

8. Process for the preparation of azo dyestuffs according to claim 1 wherein a compound of the formula

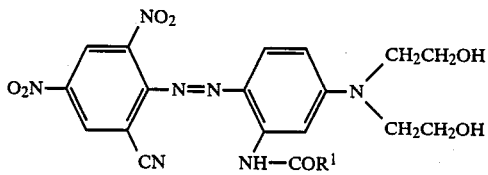

is acylated with an acylating agent of the formula

X—CO—R² wherein

X is a leaving group.

9. Process according to claim 8 wherein a mixture of at least two dyestuffs is prepared by acylating at least two different species of said compound.

10. Process for the preparation of azo dyestuff according to claim 1 wherein a compound of the formula

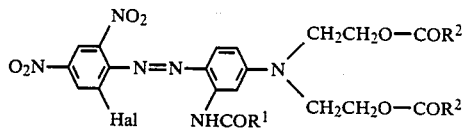

is subjected to a nucleophilic replacement reaction in which CN⁻ is the nucleophilic agent and replaces Hal, wherein Hal is halogen.

11. Process for the preparation of azo dyestuffs according to claim 1 wherein a compound of the formula

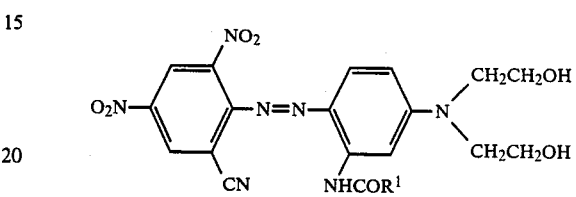

is acylated with an acylating agent of the formula

X—CO—R² wherein

X is leaving group.

12. In a method of dyeing or printing hydrophobic fibers by applying thereto an azo dyestuff, the improvement comprises said dyestuff being the azo dyestuff according to claim 1.

13. In a method of dyeing or printing hydrophobic fiber by applying thereto an azo dyestuff, the improvement comprising said dyestuff being the azo dyestuff according to claim 1.

* * * * *

UNITED STATES PATENT AND TRADEMARK OFFICE
CERTIFICATE OF CORRECTION

PATENT NO. : 4,802,889
DATED : February 7, 1989
INVENTOR(S) : BUHLER ET AL

It is certified that error appears in the above-identified patent and that said Letters Patent is hereby corrected as shown below:

On the Title page, at [19], please correct the first inventor's name to read --Bühler--.

On the Title page, at [75], please correct the first inventor's name to read --Bühler--.

On the Title page, at [75], please correct the fifth inventor's name from "Boss" to read --Boos--.

Signed and Sealed this

Ninth Day of June, 1992

*Attest:*

DOUGLAS B. COMER

*Attesting Officer*     *Acting Commissioner of Patents and Trademarks*